United States Patent [19]

Page

[11] 4,239,293
[45] Dec. 16, 1980

[54] VEHICLE BRAKING SYSTEM WITH VALVING TO CONTROL SPRING APPLIED BRAKES AND FLUID ACTUATED SERVICE BRAKE UNITS

[75] Inventor: Wilbur M. Page, Lincoln, England

[73] Assignee: Clayton Dewandre Company Limited, Lincoln, England

[21] Appl. No.: 22,096

[22] Filed: Mar. 20, 1979

[30] Foreign Application Priority Data

Mar. 22, 1978 [GB] United Kingdom ............... 11398/78

[51] Int. Cl.³ .............................................. B60T 13/00
[52] U.S. Cl. ..................................... 303/6 M; 303/9;
303/13; 303/71; 303/84 R
[58] Field of Search ................... 303/13, 9, 6 R, 6 A,
303/6 C, 6 M, 71, 28–30, 84; 188/151 A

[56] References Cited

U.S. PATENT DOCUMENTS

| 3,456,988 | 7/1969 | Gibbons et al. | 303/71 X |
| 3,863,992 | 2/1975 | Kurke et al. | 303/71 X |
| 4,003,605 | 1/1977 | Fannin | 303/71 X |

*Primary Examiner*—Douglas C. Butler
*Attorney, Agent, or Firm*—William W. Haefliger

[57] ABSTRACT

A vehicle braking system incorporating two circuits serving driven and non-driven axles respectively and in which both air-actuated service brake units and spring brake units for parking are provided on both axles. The system includes relay valving which is operable upon failure of the service braking in either circuit and responsive to the service pressure in the other circuit to provide a graduated actuation of the spring brake units in the circuit where service braking has failed. The spring brake on the driven axle and/or the relay valving is so constructed as to attenuate the force applied by the spring brake units on the driven axle.

5 Claims, 4 Drawing Figures

VEHICLE BRAKING SYSTEM WITH VALVING TO CONTROL SPRING APPLIED BRAKES AND FLUID ACTUATED SERVICE BRAKE UNITS

BACKGROUND OF THE INVENTION

This invention relates to vehicle braking systems of the kind incorporating two circuits serving driven and non-driven axles respectively and in which both air-actuated brake units (service brakes) and spring brake units (parking or secondary brakes) are provided on both axles. In such systems it is required that the spring brake units be operable by a hand control valve separate from the service brake pedal. It is also desirable that in the event of a failure of the service braking on either axle secondary braking should be brought into operation on that axle by the service foot control. It is further desirable for reasons of vehicle stability during braking, and particularly when the vehicle is less than fully laden, to reduce the degree of braking on the rear (driven) wheels in relation to that on the front (non-driven) wheels, and it is an object of the present invention to provide an improved braking system which meets these requirements.

According to the invention, a vehicle braking system of the kind referred to includes a hand control valve for venting the spring brake units for braking purposes, driver operated air valve means for effecting service actuation of the air-actuated units, and relay valve means operable on failure of the service braking in either circuit and responsive to the service pressure in the other circuit to provide a graduated actuation of the spring brake units in the circuit where service braking has failed, the spring brake units on the driven axle, and/or the relay valve means controlling operation of such units, being so constructed as to attenuate the force applied by the spring brake units on the driven axle.

Two embodiments of the invention will now be described by way of example with reference to the accompanying drawings of which:

DRAWING DESCRIPTION

DETAILED DESCRIPTION

Figure 1:
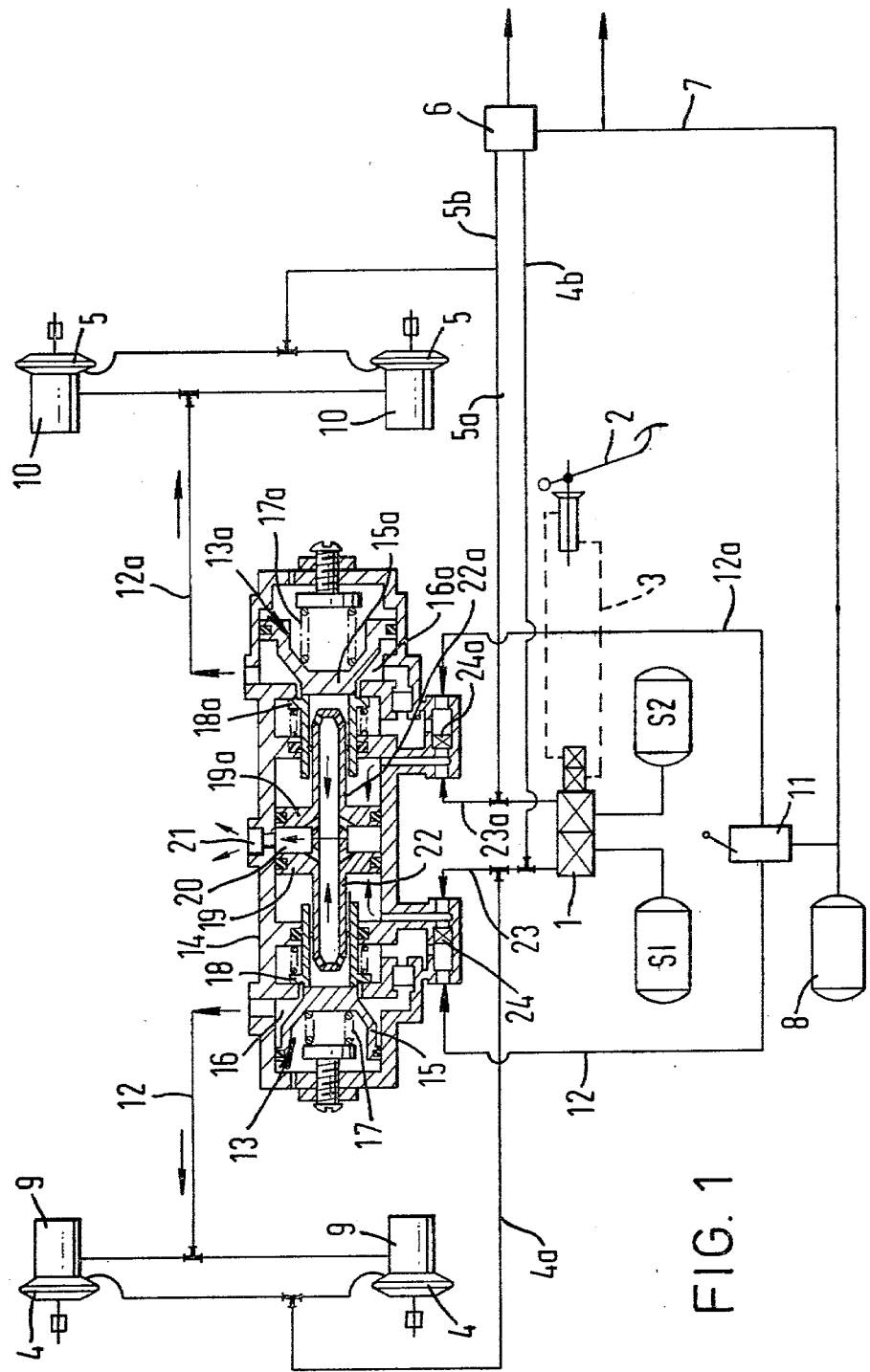
FIG. 1 is a diagram of a first embodiment of vehicle braking system a modulating valve unit which is shown in cross-section.

Referring first to the FIG. 1 of the accompanying drawings, the system shown comprises a dual air valve 1 actuated by a foot pedal 2 through a hydraulic transmission 3, although mechanical or other transmission could be used if desired, said valve controlling the supply of compressed air from Service reservoirs S1, S2 to front and rear axle diaphragm brake units 4, 5 respectively via lines 4a, 5a. Where the system is fitted to the tractor of a tractor/trailer combination, branch lines 4b, 5b lead from the lines 4a, 5a to a trailer relay valve 6 which operates in known manner in conjunction with emergency line 7 conducting air from a combined trailer and spring brake reservoir 8. Spring brake units 9, 10 are combined with the air actuators 4, 5 respectively, an associated inverted hand control valve 11 being operable in known manner to supply air from the reservoir 8 to these units via lines 12, 12a and to effect venting of the units when required. Interposed in the lines 12, 12a is a modulating valve unit comprising two inverted relay valves 13, 13a mounted in back to back relation in a common housing 14, each valve consisting of a piston valve element 15 (15a) located in a chamber 16 (16a) through which air is conducted to the associated spring brake unit, said piston valve element being urged by a spring 17 (17a), the loading of which is adjustable, into engagement with a co-axial sleeve-like valve seat element 18 (18a) which is spring-loaded onto a fixed seating. Disposed between the two relay valves in a control piston assembly consisting of a pair of pistons 19, 19a which are in abutment and define between them an annular chamber 20 which is vented to atmosphere via port 21 in the housing, each piston being formed with a hollow stem 22 (22a) which has a sealed sliding fit in the associated valve seat element 18 (18a) and the interior of which communicates with said chamber 20. Ports in the ends of the piston stems also open to the interior of the valve seat elements whilst branch lines 23, 23a, from the service lines 4a, 5a, conduct service pressures via ports in the housing 14 to the spaces at opposite sides of the control piston assembly. The degree of loading of the relay valve loading springs 17, 17a is so chosen in relation to the effective areas of the piston valve elements 15, 15a that said elements assuming a lap position in engagement with the valve seat elements 18, 18a to maintain a pressure in the associated spring brake units just sufficient to hold said units in the "release" condition.

It will be seen that with all parts functioning normally service actuation of the diaphragm units 4,5 is accompanied by the application of service pressure to opposite sides of the control piston assembly which thus remains stationary whilst, for parking, hand control valve 11 can be actuated to vent the spring brake units 9, 10 and so apply the spring brake units independently of the modulating unit control. Should, however, the service braking of one axle e.g. the front axle fail, pressures across the control piston assembly will become unbalanced the next time the foot pedal 2 is actuated and said assembly will move to the left until the piston stem 22 engages the piston valve element 13 and lifts it from the associated valve seat element 18 against the loading of spring 17. Thus, by appropriate design of the relay valve including its spring loading it is possible to effect a graduated application of the front spring brake unit in dependence upon the service pressure transmitted to the rear diaphragm units. Compounding of spring and service actuator forces is avoided in the event of foot and hand valve application by the inclusion of change-over valves 24 and 24a.

As previously mentioned, differential braking of the rear axle is desirable under certain conditions and this is achieved in the system above described by choosing a piston area for the piston valve element 15a and proportionately the graduated spring force acting thereon, such that there is achieved a desired reduction, e.g. 50% in braking force applied by the rear spring brakes relative to that provided by the spring brakes on the front axle. It is to be understood, however, that modulation only applies in the event of a service line failure, full parking pressure on both axles being available by operation of hand valve 11.

Figure 2:
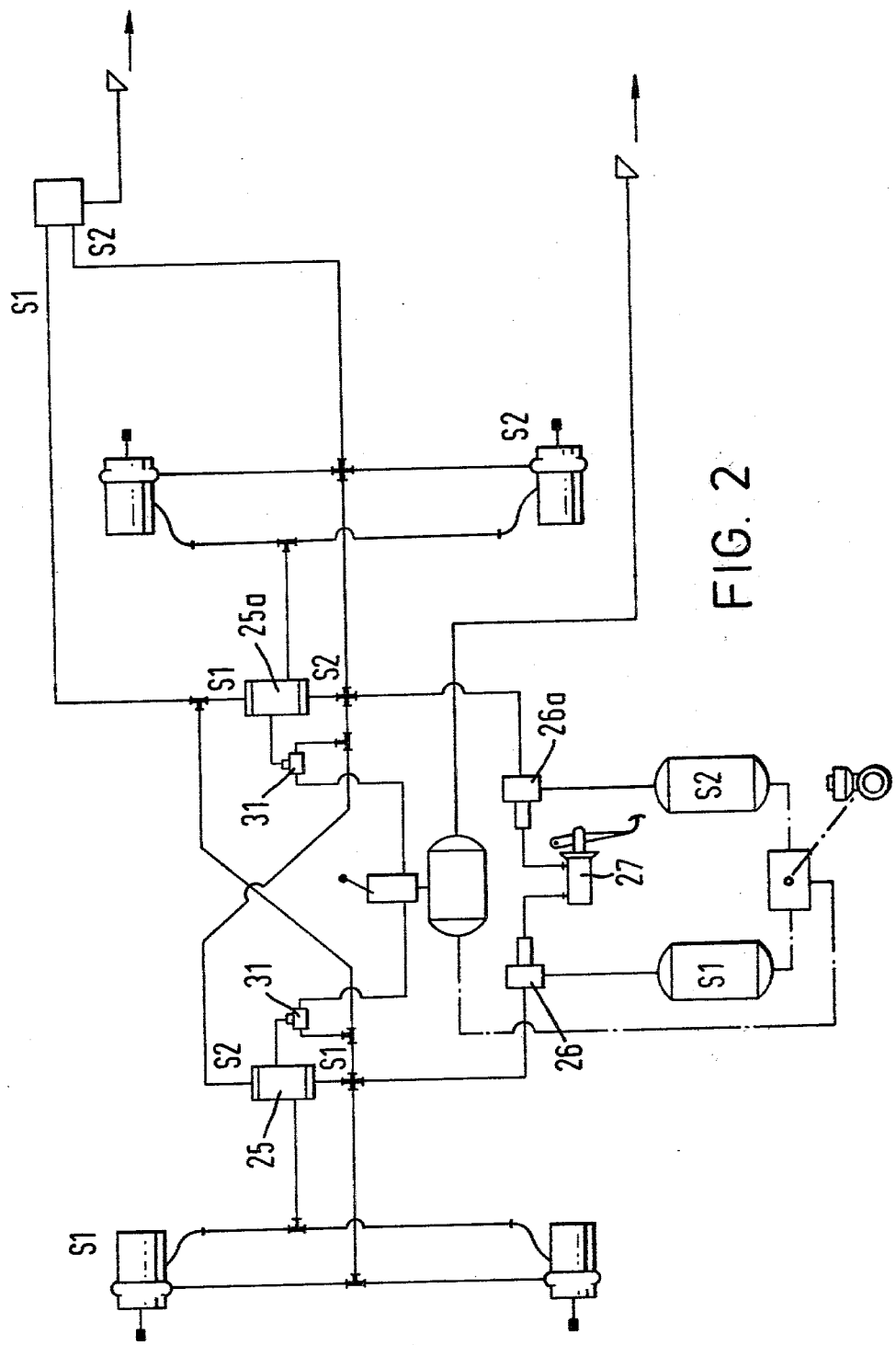
FIG. 2 is a diagram of another embodiment of vehicle braking system but with the separate modulating valves, and FIGS. 3 and 4 respectively are cross-sectional views of modulating valves suitable for use in association with the front and rear axle spring brake units of the system shown in FIG. 2.
Figure 3:
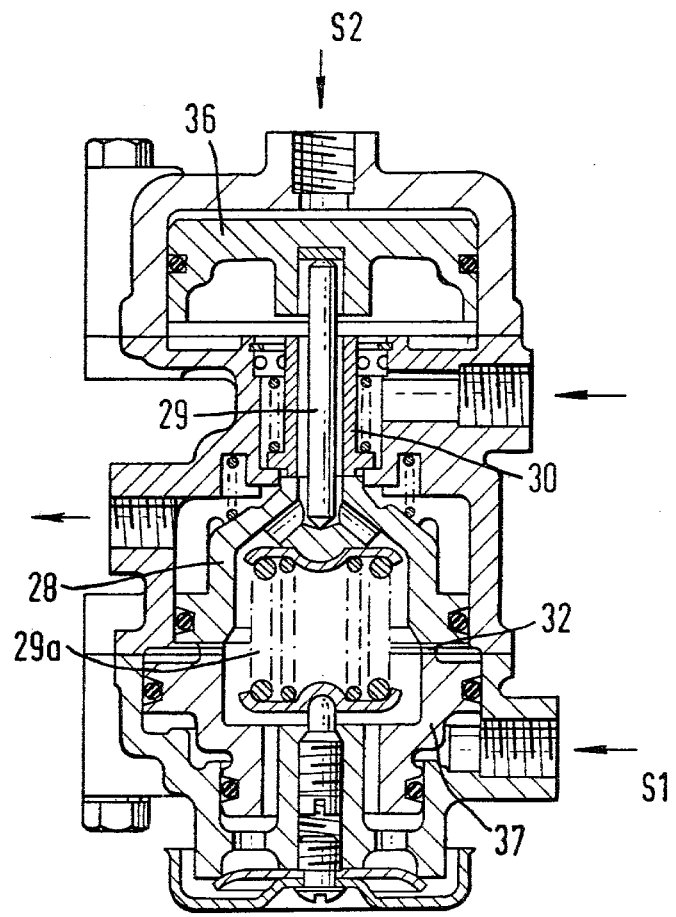

FIG. 2 shows an alternative system using two separate modulating valves 25, 25a, with separate air valves 26, 26a actuated hydraulically from a pedal operated master cylinder 27, the arrangement having the advantage that the components can be grouped at or near the relevant axles and also having been found to result in a more balanced and responsive braking control. The modulating valve 25 is shown in detail in FIG. 3 and it will be noted comprises opposed pistons 36, 37 responsive respectively to the two service pressures, the piston 37 directly abutting a relay piston 28 whilst the piston 36 has a thrust-transmitting connection with the relay piston via a rod 29. The relay piston is loaded by adjustable spring means 29a and is constructed as a valve element to co-act with the valve seat element 30 to control venting of the associated spring brakes in a manner similar to the relay valve 13 of FIG. 1. In the valve of FIG. 3 which is for use in association with the front axle spring brakes, the effective areas of the pistons 36, 37 are equal so that full spring brake output is achieved under all conditions but in the modified valve 25a used in association with the rear axle spring brakes and shown in FIG. 4, the piston 37a responsive to front axle service pressure is smaller than the piston 36a responsive to rear axle service pressure whereby in the failed condition of the front axle service circuit the hold-off pressure at the rear spring brakes would be correspondingly reduced, said reduction being, for example, of the order of 50% with a piston area ratio of 1:2. Change-over valves 31 are inter-connected into the system as shown in FIG. 2. to prevent compounding of air and spring brakes on either axle.

Figure 4:
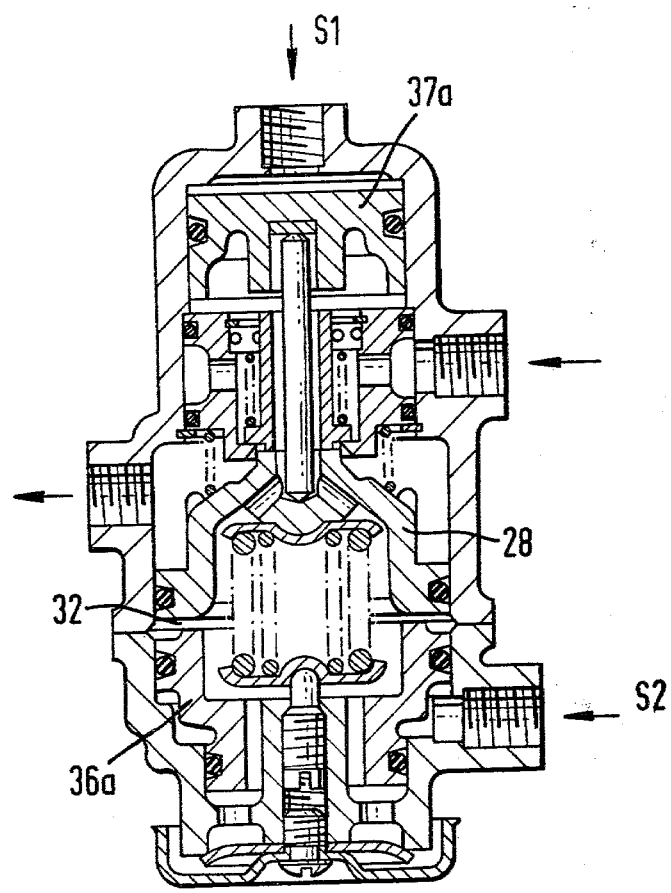

It is to be noted that in the modulating valves shown in FIGS. 3 and 4 a radial port 32 between the pistons 37, 28 leads to the interior of these pistons which is permanently connected to atmosphere, this arrangement being the equivalent of the vent port 21 in FIG. 1. In both instances, the pistons at either side of the port or vent are sealed against the housing wall and this seal venting ensures that a seal or other failure in one circuit cannot go unnoticed whilst at the same time maintaining operation of the other circuit.

I claim:

1. A vehicle braking system of the kind incorporating two circuits serving driven and non-driven axles respectively in which both fluid actuated service brake units and spring brake units are provided on both axles, comprising a hand control valve for venting the spring brake units for braking purposes, driver operated fluid valve means for effecting actuation of the fluid actuated units, and relay valve means operable on failure of the service braking in either circuit and responsive to the service pressure in the other circuit to provide a graduated actuation of the spring brake units in the circuit where service braking had failed, at least one of the spring brake on the driven axles and the relay valve means controlling operations of such units, being so constructed as to attenuate the force applied by the spring brake units on the driven axle, the relay valve means comprising two relay valves each controlling the supply of fluid to the spring brake unit on one of the axles and operable, when the service pressure in the said one circuit fails, in response to the service pressure in the other circuit, to control venting of the associated spring brakes.

2. A vehicle braking system according to claim 1 comprising a control piston assembly between the two relay valves and comprising two opposed pistons which abut one another and are respectively responsive to the pressure in the two circuits so that upon failure of the service braking in one circuit the assembly becomes unbalanced and moves to operate the relay valve associated with the spring brake units in the circuit where the service brakes have failed.

3. A vehicle braking system according to claim 2 wherein each relay valve comprises a piston valve element which is movable from its seat against a graduated spring force to vent the associated spring brake and wherein the effective area of the piston valve element associated with the driven axle, and the graduated spring force acting thereon are so selected as to provide modulated spring braking at a reduced ratio.

4. A vehicle braking system according to claim 1 wherein each relay valve comprises opposed pistons responsive respectively to the two service pressures and one of which abuts a relay valve element the other having a thrust transmitting connection therewith, to control venting of the associated spring brake unit.

5. A vehicle braking system according to claim 4 wherein, in the relay valve associated with the driven axle spring brake units, the piston subject to the non-driven axle service pressure is smaller than this piston subject to the driven axle service pressure whereby the said attenuation is achieved.

* * * * *